US006927545B2

(12) United States Patent
Belliveau

(10) Patent No.: US 6,927,545 B2
(45) Date of Patent: Aug. 9, 2005

(54) IMAGE PROJECTION LIGHTING DEVICE DISPLAYS AND INTERACTIVE IMAGES

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 149 days.

(21) Appl. No.: 10/385,144

(22) Filed: Mar. 10, 2003

(65) Prior Publication Data

US 2004/0178750 A1 Sep. 16, 2004

(51) Int. Cl.[7] .......................... G05F 37/02; G03B 21/26

(52) U.S. Cl. .......................................... 315/294; 353/30

(58) Field of Search ................................ 315/294, 295, 315/316, 317, 368.28; 353/30–34, 37, 101

(56) References Cited

U.S. PATENT DOCUMENTS

| | | | | |
|---|---|---|---|---|
| 6,188,933 B1 | | 2/2001 | Hewlett et al. | 700/19 |
| 6,219,093 B1 | | 4/2001 | Perry | 348/135 |
| 6,334,686 B1 | * | 1/2002 | Shiraishi et al. | 353/57 |
| RE38,084 E | * | 4/2003 | Hashizume et al. | 353/101 |
| 6,595,645 B2 | * | 7/2003 | Shiraishi et al. | 353/57 |
| 6,605,907 B2 | * | 8/2003 | Belliveau | 315/294 |
| 6,644,817 B2 | * | 11/2003 | Kuroda et al. | 353/119 |
| 6,765,544 B1 | * | 7/2004 | Wynne Willson | 345/6 |
| 2002/0093296 A1 | | 7/2002 | Belliveau | 315/294 |
| 2003/0112507 A1 | * | 6/2003 | Divelbiss et al. | 359/464 |

OTHER PUBLICATIONS

Five page printout from internet, Pallindrome Performance Systems, Palindrome Intermedia Performance Group—PPS www.palindrome.de/pps.htm, printout dated Mar. 10, 2003—not all of printout may be prior art.

Five page printout of "Midi Dancer" from www.troikaranch.org/mididancer.html; printout dated Mar. 10, 2003—not all of printout may be prior art.

* cited by examiner

*Primary Examiner*—Don Wong
*Assistant Examiner*—Minh Dieu A
(74) *Attorney, Agent, or Firm*—Walter J. Tencza, Jr.

(57) ABSTRACT

An improved multiparameter lighting fixture is provided comprising a base, a yoke, a lamp housing, and a communication port for receiving address and command signals. The lamp housing may be comprised of a lamp, a light valve, and a lens. The lamp, the light valve and the lens may cooperate to project, for example, an ownership image, a fixture identifier image, a time identifier image, a show identifier image, a content identifier image, or an effects identifier image. The lamp, the light valve and the lens may cooperate to produce a first image on a projection surface and a second image may be created from the first image by applying an interactive effect to the first image in response to an image captured by a camera.

53 Claims, 8 Drawing Sheets

IMAGE PROJECTION LIGHTING DEVICE DISPLAYS AND INTERACTIVE IMAGES

FIELD OF THE INVENTION

This invention relates to image projection lighting devices.

BACKGROUND OF THE INVENTION

The embodiments of the present invention generally relate to lighting systems that are digitally controlled and to the lighting fixtures used therein, in particular multiparameter lighting fixtures having one or more image projection lighting parameters.

Lighting systems are typically formed by interconnecting, via a communications system, a plurality of lighting fixtures and providing for operator control of the plurality of lighting fixtures from a central controller. Such lighting systems may contain multiparameter light fixtures, which illustratively are lighting fixtures having two or more individually remotely adjustable parameters such as focus, color, image, position, or other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multi-parameter lighting devices are described in the product brochure entitled "The High End Systems Product Line 2001" and are available from High End Systems, Inc. of Austin, Tex.

A variety of different types of multiparameter lighting fixtures are available. One type of advanced multiparameter lighting fixture, which is called an image projection lighting device ("IPLD"), uses a light valve to project images onto a stage or other projection surface. A light valve, which is also known as an image gate, is a device, such as a digital micro-mirror ("DMD") or a liquid crystal display ("LCD"), that forms the image that is to be projected.

United States patent application titled "Method, apparatus and system for image projection lighting", inventor Richard S. Belliveau, publication no. 20020093296, Ser. No. 10/090926, filed on Mar. 4, 2002, incorporated by reference herein, describes prior art IPLDs with cameras and communication systems that allow camera content, such as in the form of digital data, to be transferred between IPLDs.

IPLDs of the prior art use light from a projection lamp that is sent though a light valve and focused by an output lens to project images on a stage. The light cast upon the stage by the IPLD is then imaged by the camera. U.S. Pat. No. 6,219,093 to Perry titled "Method and device for creating the facsimile of an image", incorporated herein by reference describes a camera that may be an infrared camera for use with a described lighting device that uses liquid crystal light valves to project an image. "Accordingly the camera and light are mounted together for articulation about x, y, and z axes as is illustrated in FIG. 1" (Perry, U.S. Pat. No. 6,219,093, col. 4, line 59).

The prior art patent to Perry, U.S. Pat. No. 6,219,093 makes use of a camera to distinguish objects in the camera's field from other objects. The distinguished object as imaged by the camera is then illuminated by the projected light passing through the light valves so as to only illuminate the distinguished object. The objects may be provided with an infrared emitter or reflector which interacts with a receiver or camera. Perry relies on the light produced from the projection lamp and the light valves to provide the illumination to the scene where the camera images or separate emitters or reflectors are provided with the objects on the stage.

United States patent application titled "METHOD AND APPARTUS FOR CONTROLLING IMAGES WITH IMAGE PROJECTION LIGHTING DEVICES", inventor Richard S. Belliveau, Ser. No. 10/206,162, filed on Jul. 26, 2002, incorporated by reference herein, describes control systems for IPLDs and IPLDs with cameras and more specifically the control of images in a lighting system that includes multiparameter lights having an image projection lighting parameter.

United States patent application titled "Image Projection Lighting Devices with Visible and Infrared Imaging", inventor Richard S. Belliveau, Ser. No. 10/290,660 filed on Nov. 8, 2002, incorporated by reference herein, describes IPLDs that contain cameras that can capture both visible and infrared images.

U.S. Pat. No. 6,188,933 to Hewlett titled Electronically Controlled Stage Lighting System describes a memory that automatically maintains a registry of parts which are changed, and important system events, such as lamp life, over temperatures, and other things. The supervisor maintains a registry of the various events with a real time clock. The information in the registry can be updated to a tech port as a parameter every 15 seconds or commanded to be displayed by the lamp itself. A lamp display command causes the messages in the registry to be converted to fonts and used to control the DMD to display the text as a shaped light output. This allows detecting the contents of the registry without a dedicated display terminal using the existing digital light altering device as a display mechanism.

Control of the IPLDs is affected by an operator using a central controller that may be located several hundred feet away from the projection surface. In a given application, there may be hundreds of IPLDs used to illuminate the projection surface, with each IPLD having many parameters that may be adjusted to create a scene. During the creation of a scene the operator of the central controller may adjust the many parameters of each of the plurality of IPLDs. For each new scene created the process is repeated. A typical show may be formed of hundreds of scenes. The work of adjusting or programming the parameters to the desired values for the many IPLDs to create a scene can take quite some time. Many times the scenes are created by the operator during a rehearsal and the time for programming the many IPLDs has limitations. When the operator of the central controller is looking at the projection surface that is projected upon by many IPLDs it can be difficult to determine which IPLD on the projection surface as related to a specific fixture number displayed at the central controller.

The term "content" refers to various types of works such as videos, graphics, and stills that are projected by an IPLD as an image or images. A plurality of IPLDs may each be projecting different images as determined by the content on the projection surface. The content used to form an image that each IPLD projects on the projection surface is selected by an operator of a central controller. The central controller provides a visual list on a display monitor of each fixture number of the plurality of IPLDs and a content identifier of the content that is being projected. When the operator is looking at the projection surface the operator can see the different images of the content being projected but can not determine what the content identifier is until associating the fixture number with the content identifier on the visual list on the central controller.

The IPLDs used on a show are usually provided to the show as rental equipment. The IPLDs are quite complex and relatively expensive devices. For some shows several different lighting companies may rent the IPLDs to the show. The IPLDs are often transported to and from the shows by truck. Expensive lighting instruments are occasionally stolen from a show or in some instances an entire truck may be stolen. The lighting company that is the victim of theft may report the stolen lighting instrument serial numbers to a law enforcement agency. Unfortunately many of the stolen lighting instruments end up many miles away and are possibly sold to other lighting companies who have no idea that they are purchasing stolen merchandise. The need exists to increase the awareness of ownership of an IPLD that has been stolen by anyone attempting to purchase the stolen product.

If for each IPLD each of the parameters of pan, tilt, selectable content, image rotate, zoom, focus and color adjustment needed to be adjusted this would be very time consuming for the operator of the central controller. If during one scene the content that creates the images projected on the projection surface by the plurality of IPLDs can be animated such as a movie, the scene can remain longer before boredom occurs to the audience viewing the show and fewer scenes may be required for the programming of the show. One way of increasing the audience's involvement during a show is by allowing the performer to interact with the show itself. This can be done by sensors that monitor a performer and allow certain aspects of the show to change with the actions of the performer based on sensor input. The MidiDancer manufactured by Troika Ranch of Brooklyn N.Y. is a device worn by a dancer that provides sensor monitoring of the dancers movement. The MidiDancer uses sensors to measure the flexion of up to eight joints on the dancer's body and then transmits the position of each of those joints to a computer off stage. Once interpreted by software running on the computer, the information can be used to control a variety of computer-controllable media including digital video or audio files, theatrical lighting, robotic set pieces or any number of other computer controllable devices. Palindrome Performance of Nurnberg Germany has developed a software program using a personal computer that tracks a performer's movement on a stage. The personal computer then can be connected to various types of devices that interact with the movement of a performer. There is a need to produce an image projection lighting device that can produce interactive images that maintain the audience's attention greater than the video and still images of the prior art.

SUMMARY OF THE INVENTION

There is a need to provide an operator with a way of observing the content identifier of a particular IPLD when looking at the projection surface comprised of a plurality of IPLDs. This is accomplished in another aspect of the invention by projecting the content identifier of the content that is being projected by the particular IPLD.

In another aspect of the invention a time display can be projected by each of the IPLDs used for the show. The time display can be seen superimposed with the projected image that is projected on the projection surface by an IPLD. This allows the operator to keep easy visual track of the time when the rehearsal time is limited.

In another aspect of the invention in one or more embodiments images projected on to the projection surface by an IPLD are made interactive with the actions or images of performers, the audience or objects in front of the projected images. This allows the images to continually change in response to actions of the performers or other objects in front of the projected images.

In one or more embodiments of the present invention an improved multiparameter lighting fixture is provided comprising a base, a yoke, a lamp housing, and a communication port for receiving address and command signals. The lamp housing may be comprised of a lamp, a light valve, and a lens. The lamp, the light valve and the lens may cooperate to project an ownership image on a projection surface. The ownership image may be created by ownership image data. The ownership image data may be entered by a purchaser of the multiparameter lighting fixture. The ownership image projected on the projection surface may be comprised, for example, of a name of an owner, an address, a phone number, a web address, and/or a logo. In one or more embodiments, the ownership image can be changed with a password.

One or more embodiments of the present invention may include a stand alone control system. The lamp, the light valve, and the lens of the multiparameter lighting fixture may cooperate to project the ownership image on a projection surface when an input is received at the stand alone control system. The communications port may receive an address and a command and the lamp, the light valve, and the lens may cooperate by projecting an ownership image on a projection surface.

In one or more embodiments the lamp, the light valve, and the lens may cooperate to project a fixture identifier image on the projection surface that is used to identify the multiparameter lighting fixture from a plurality of multiparameter lighting fixtures projecting on the projection surface. The fixture identifier image may be displayed on the projection surface in response to a command from a central controller and an operator of the central controller may identify the multiparameter lighting device. The fixture identifier image may be superimposed over an additional image being projected by the multiparameter lighting fixture.

In one or more embodiments, the lamp, the light valve, and the lens cooperate to project a time identifier image on a projection surface that can be observed by an operator of a central controller to better manage programming time. The time identifier image may be displayed on the projection surface in response to a command from the central controller. The time identifier image may be superimposed over an additional image being projected by the multiparameter lighting fixture. The time identifier image may be a count down timer image.

The lamp, the light valve, and the lens may cooperate to project a show identifier image on a projection surface that can be observed by an operator of a central controller to identify a current show. The show identifier image may be a logo. The show identifier image may be a performer's name who is performing during a current show. The show identifier image may be a title of the current show. The show identifier image may be displayed on the projection surface in response to a command from a central controller. The show identifier image may be superimposed over an additional image being projected by the multiparameter lighting fixture.

In one or more embodiments, the lamp, the light valve, and the lens may cooperate to project a content identifier image on a projection surface that can be observed by an operator of a central controller to identify content used to project an image on the projection surface. The content identifier image may be displayed on the projection surface in response to a command from a central controller. The content identifier image may be superimposed over an additional image being projected by the multiparameter lighting fixture.

In one or more embodiments, the lamp, the light valve, and the lens may cooperate to project an effects identifier image on a projection surface that is observed by an operator of a central controller to identify an interactive effect used to modify an image on the projection surface. The effects identifier image may be displayed on the projection surface in response to a command from a central controller. The effects identifier image may be superimposed over an additional image being projected by the multiparameter lighting fixture.

In one or more embodiments of the present invention, in response to an ownership inquiry command received at a communications port, ownership data is transmitted from the communications port. The ownership data may be transmitted from the communications port to a central controller to be viewed on a monitor of the central controller.

In one or more embodiments of the present invention, the lamp, the light valve and the lens cooperate to produce a first image on a projection surface and a second image is created from the first image by applying an interactive effect to the first image in response to an image captured by the camera. A communications port may receive a command to apply the interactive effect to the first image and the multiparameter lighting fixture responds by applying the interactive effect to the first image to create the second image. The interactive effect applied to the first image in response to the image captured by the camera may be influenced by a change made by a performer or an audience.

The image captured by the camera may be comprised of several colors including a key color. The key color may be used to determine the interactive effect applied to the first image in response to the image captured by the camera. The key color may, for example, be infrared, red, green, or blue.

The interactive effect applied may, for example, be zoom, invert, rotate, digital zoom, color modification, image shake, tiling, wobble, or image distort.

DETAILED DESCRIPTION OF THE DRAWINGS

Figure 2:
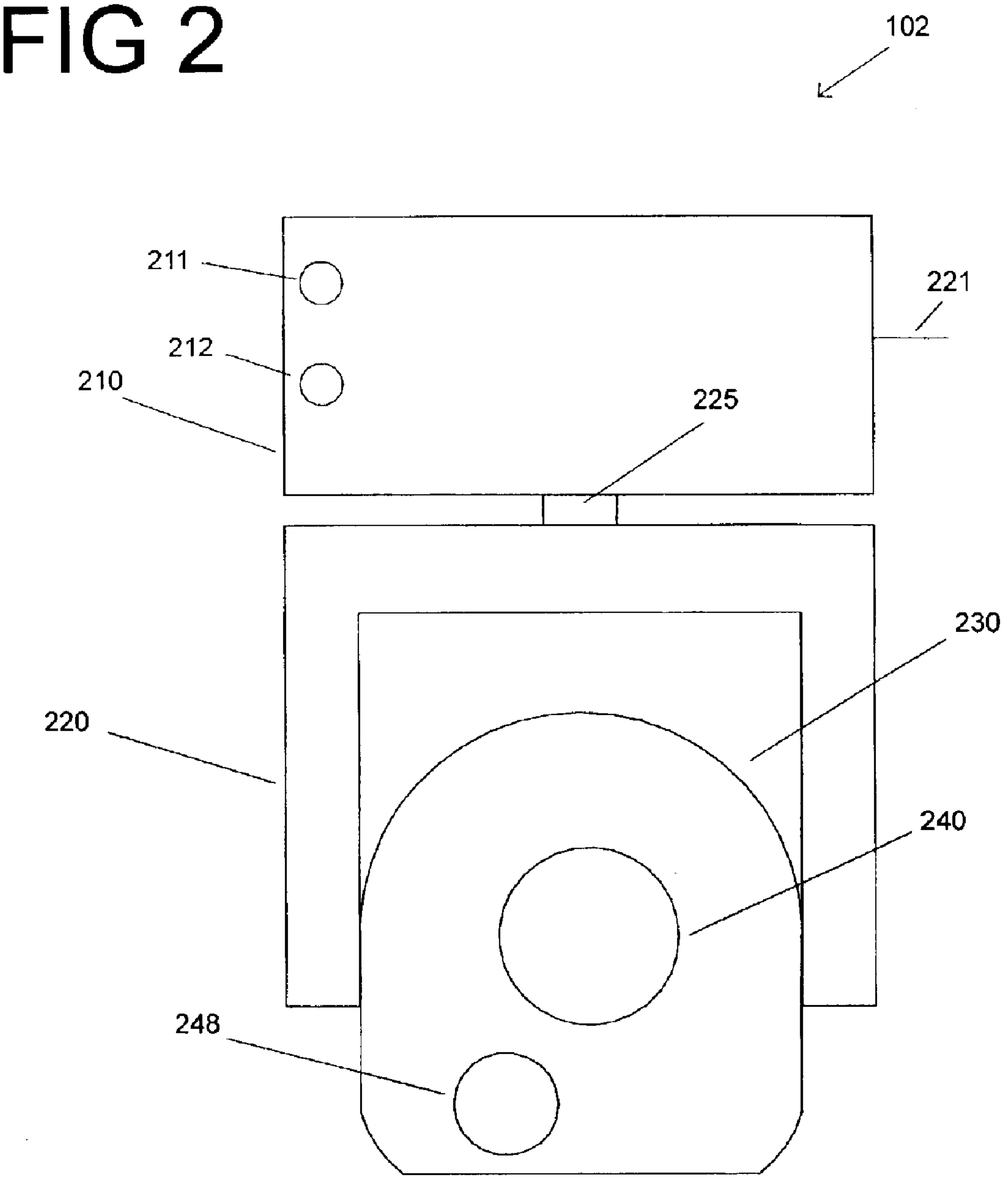
FIG. 2 shows the image projection lighting device of FIG. 1.

FIG. 2 shows an IPLD 102 in accordance with an embodiment of the present invention. The IPLD 102 includes a base or electronics housing 210, a yoke 220, and a lamp housing 230. The IPLDs 102 and 104 shown in FIG. 4 may each be identical to the IPLD 102 of FIG. 2 and FIG. 3.

Figure 3:
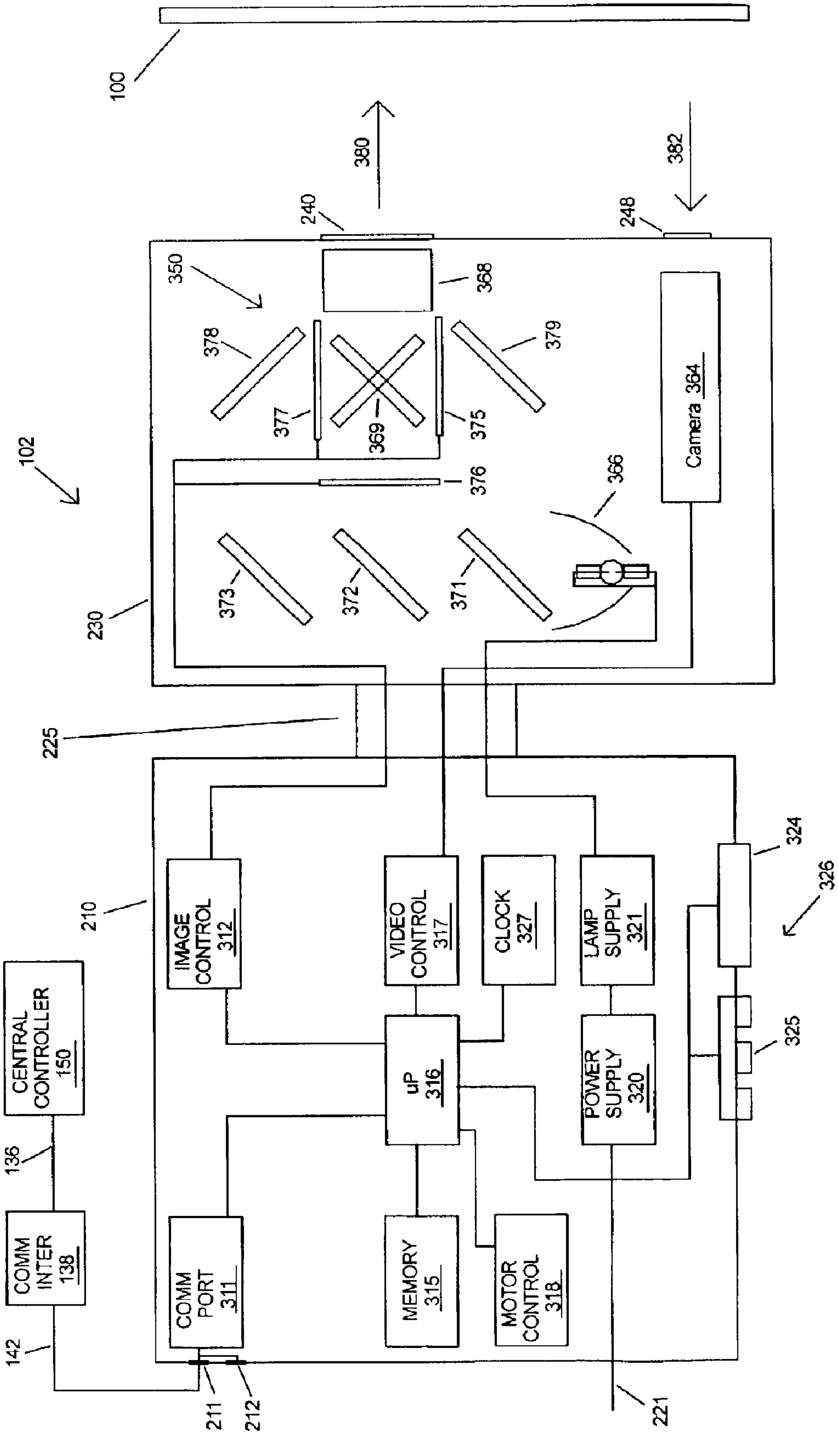
FIG. 3 shows a block diagram of components within a base housing of the image projection lighting device of FIG. 2.
Figure 4:
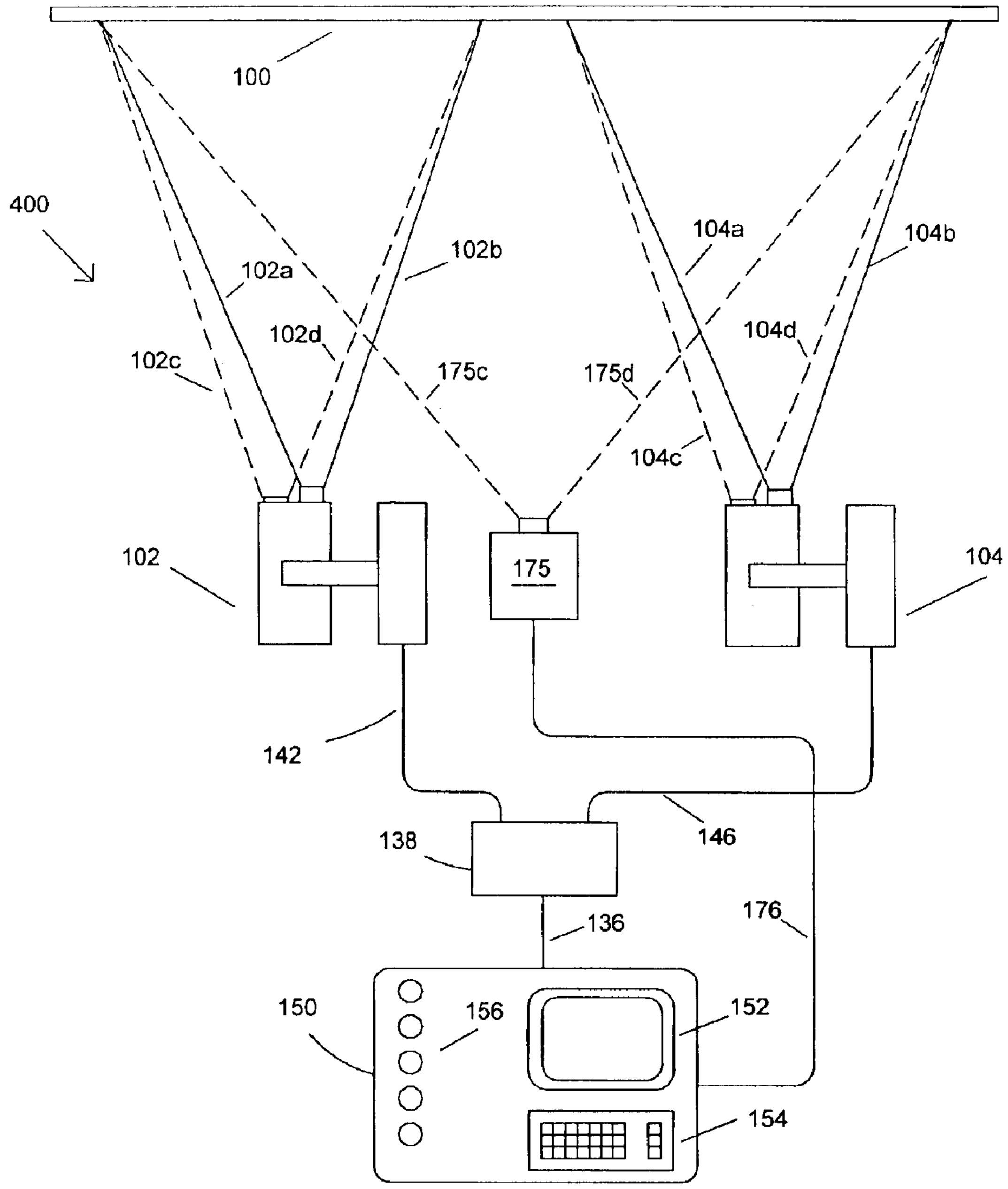
FIG. 4 shows a lighting system using two image projection lighting devices in accordance with an embodiment of the present invention, a separate camera and a central controller.

The base housing 210 of the IPLD 102 includes connection points 211 and 212 for electrically connecting a communications line, such as communications line 142 shown in FIG. 4. A power cable 221 for connecting to a source of external power is shown. The yoke 220 is physically connected to the housing 210 by a bearing 225 which allows the yoke 220 to pan or rotate in relation to the base or electronics housing 210. The lamp housing 230 is connected to the yoke 220 by bearings not shown for simplification. This allows the lamp housing 230 to rotate with respect to the yoke 220. The yoke 220 is a mechanical component that allows the lamp housing 230 to rotate in relation to the base 210. The lamp housing 230 typically contains optical components such as a light valve and a lamp used to project images on a projection surface and may contain a camera. A projection exiting aperture 240 is shown in FIG. 2. An aperture 248 is shown for allowing a camera 364 shown in FIG. 3, within the lamp housing 230 to receive and capture images. IPLD 102 is shown with a separate base housing 210 and lamp housing 230, however it is known in the art to produce an image projection. lighting device with a single housing using a mirror to position the projected light images. FIG. 3 shows components within or part of the base housing 210 and within or part of the lamp housing 230 of the IPLD 102. FIG. 3 also shows the central controller 150. The components within or part of the base housing 210 include a communications port (shown as “comm port”) 311 that is electrically connected to external communication connectors 211 and 212 that may be the same as 211 and 212 of FIG. 2. A power supply 320 is shown connected to the external power cable 221 that may be the same as 221 of FIG. 2. The power supply 320 supplies the power to various electronic components. Also shown is an image control 312, memory 315, microprocessor or processor 316, video control 317, motor control 318, lamp power supply control 319, motor power supply 320, clock 327 and lamp power supply 321. A bearing 225 is shown rotably connecting the lamp housing 230 to the base housing 210, in FIG. 3, and although only one bearing is shown for simplification more than one bearing may rotably connect the lamp housing 230 to the base housing 210. A display device 324 is also shown within or connected to the base housing 210. The display device 324 may be a display for alphanumeric characters or a video display capable of displaying video images. An input keypad 325 is also shown within or connected to the base housing 210. The input keypad 325 together with the display device 324 can be called a stand alone control system 326. The stand alone control system 326 can be used to enter data and to control the parameters of the IPLD 102. The display device 324 may be a touch screen display device that accepts input by the touching of the screen so that the keypad 325 may not be necessary. The processor 316 may route content to be displayed by the display device 324 and accept input commands from the input keypad 325.

The components within or part of the lamp housing 230 include the lamp 366 that projects a white light to a red color separation system filter 371. The color separation filter 371 reflects red light from the white light to a reflecting mirror 379 where it is directed to a red light valve 375 and imaged red light passes to a color combining system 369. Blue green light passes though the red color separation filter 371 and is directed to a green color separation filter 372 that in turn reflects green light to a green light valve 376 that passes imaged green light to the color combining system 369. The green separation filter 372 passes blue light that is sent to a blue separation filter 373 and the blue light is reflected off the blue separation filter 373 and passed to a reflector 378. The reflector 378 reflects the blue light to a blue light valve 377 where the imaged blue light is directed to the color combining system 369. The color combining system 369 combines the imaged red, green and blue light that has been imaged by the red, green and blue light valves 375, 376 and 377 respectively and passes the multicolored light images to a zoom and focus lens 368 where it is directed through the aperture 240 in the direction of arrow 380 to the projection surface 100. The red, blue and green light valves 375, 376 and 377 respectively are controlled to produce images by the image control 312.

A camera 364 can receive images from the projection surface 100 in the direction of arrow 382 though the aperture 248. The captured camera images are sent as data to the video control 317 where they can be processed and passed on to the processor 316.

The projected multicolored images that are created from content that can be projected on the projection surface 100 by IPLD 102 are generated by the red, green and blue light valves 375, 376 and 377, respectively. Content used to produce the images that are projected on the projection surface 100 by IPLD 102 may be stored in the memory 315 or content to be projected may be received over the communication system comprised of lines 136, 142 and 146 and communications interface 138 from the central controller 150 shown in FIG. 4. The communications interface 138 may be a router or hub as known in the communications art. The communications interface 138 may not be required for some communications systems.

The general capturing of images and sending image data to other lighting devices is described in detail in pending patent application Ser. No. 10/090926, to Richard S. Belliveau, the applicant herein, publication no. 20020093296, filed on Mar. 4, 2002, titled "Method, apparatus and system for image projection lighting", which is incorporated by reference herein.

Figure 1:
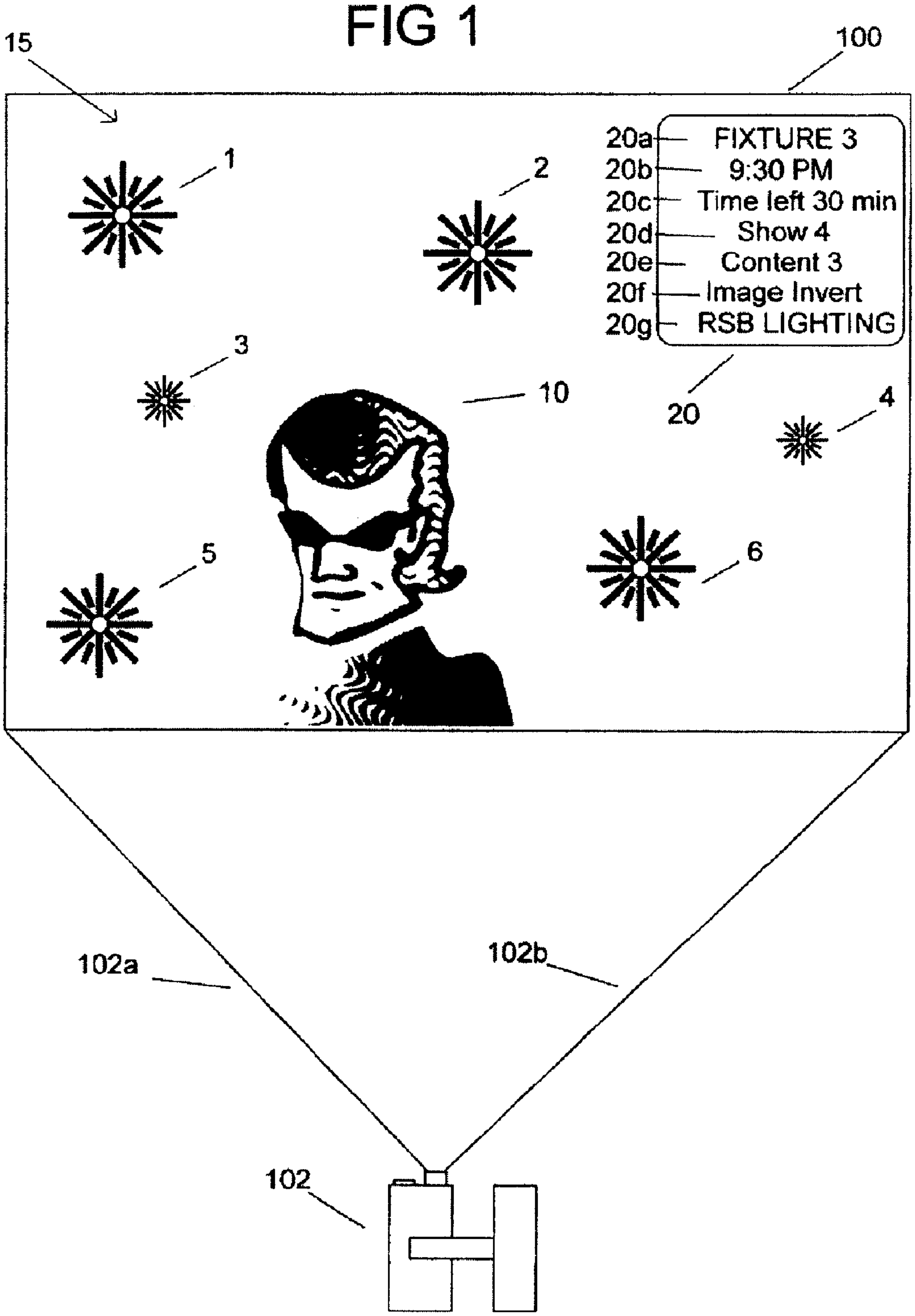
FIG. 1 shows an image projection lighting device in accordance with an embodiment of the present invention projecting an image onto a projection surface along with an information display that shows the fixture number, the time, the show, a content identifier and ownership display.

The central controller 150 outputs address and control commands over a communications system which may include communications interface 138 of FIG. 1. The communications interface 138 is connected to the communications port 311 at connection point 211 by communications line 142 as shown in FIG. 3. The image control 312 of the electronics housing 210 provides control signals to the light valves 375, 376 and 377, respectively, in the lamp housing 230. The microprocessor 316 in the electronics housing 210 provides control signals to the image control 312. The microprocessor 316 is shown electrically connected to the memory 315. The memory 315 stores the computer software operating system for the IPLD 102 and possibly different types of content used to form images at the light valves 375, 376 and 377 of the lamp housing 230. The light valves 375, 376 and 377 respectively may be transmissive type light valves where light from the projection lamp 366 is directed to the light valves 375, 376 and 377 to be transmitted through the light valves 375, 376 and 377 to the lens 368. As known in the prior art a light valve can be a reflective light valve where light from the projection lamp 366 is directed to the light valves 375, 376 and 377 to be reflected from the light valves 375, 376 and 377 to the lens 366.

The motor control 318 is electrically connected to motors that control the zoom and focus as will as position the lamp housing 230 in relation to the yoke 220 and the yoke 220 in relation to the base housing 210. The electrical connection to the motors and the motors are not shown for simplification. The motor control 318 is electrically connected to receive control signals from the microprocessor 316. Two power supplies are shown in FIG. 3. A power supply 320 is shown for supplying power to the various electronic components and a lamp power supply 321 is shown for supplying power to the main projection light source or lamp 366. A clock 327 can be part of the microprocessor 316 or any device that can keep track of time. The clock 327 can provide time data to the microprocessor 316 that can be acted on in accordance with the operational program stored in memory 315. The time data provided by clock 327 can be used by the processor 316 to provide timing information to the image control 312 that can be projected as fonts or graphics on the projection surface 100 by the IPLD 102.

The camera 364 may bee type of camera known in the art such as a device that receives light images with a contained camera sensor and converts the light images into electronic image data or signals. The camera 364 may be of a type, as known In the art, which may be constructed of only a camera sensor or the camera 364 may contain other optical components in an optical path of the camera sensor along with suitable control electronics that may function to zoom arid focus the camera 364.

The video control interface 317 of the electronics housing 210 sends image data or signals as received from the camera 364 to the microprocessor 316. The microprocessor 316 may send this image data or signals to the communications port 311 for transmission back to the central controller 150 or to other IPLDs on the communications system such as IPLDs 102 and 104 connected to communication interface 138 in FIG. 4. The communications port 311 may be a part of the processor 316. The communications port 311 can be any device capable of receiving a communication sent over the communications system. The camera 364 may be sensitive to infrared light, to visible light, or both. The IPLD 104 of the lighting system 400 of FIG. 4 may use the image data received over the communications system from the camera of IPLD 102 and the IPLD 104 may project images that were captured by the camera 364 that originated at IPLD 102.

FIG. 4 shows a lighting system 400 that includes IPLDs 102 and 104. Although only two IPLDs are shown for the lighting system 400 as many as one hundred or more IPLDs can be used to create a show. The central controller 150 has a keyboard entry device 154 and input devices 156 to allow an operator to input commands for controlling the IPLDs 102 and 104. The central controller 150 has a visual display monitor 152 so the operator can see the details of the show that the operator programs on the central controller 150. The details shown on the monitor 152 can be the show identification number, a list of IPLD fixture numbers, a scene number, as well as the setting of the parameters for each IPLD, such as IPLDs 102 and 104 of FIG. 4.

The commands entered by the operator of the central controller 150 are sent over a communications system using communications lines 136, 142, 146 and communications interface 138 to the IPLDs 102 and 104 of FIG. 4. Each IPLD has an operating address that is different than the operating address of other IPLDs so that the operator can command a specific IPLD from a plurality of IPLDs. The desired operating address is input by the operator of the central controller 150 by inputting to the keyboard 154 or other input device of the central controller 150. The desired operating address is sent over the communication system where it is received by the plurality of IPLDs. A receiving IPLD such as IPLD 102 receives the desired operating address at the communications port 311 of FIG. 3 of the IPLD that the operator of the central controller 150 would like to command. The received operating address is compared with the operating address stored in the memory 315 of FIG. 2 and if the received operating address matches the operating address stored in the memory 315, of IPLD 102, for example, then next the IPLD 102 is ready to receive commands from the central controller 150. The operating addresses for IPLDs 102 and 104 are often listed and shown as "fixture numbers" on the central controller display 152 as the actual operating address of the IPLD can be a digital number.

Once the desired IPLD has been addressed by the operator of the central controller 150 the operator may next send commands that vary the parameters of the addressed IPLD. Some examples of the commands sent are pan, tilt, selection of content, intensity, image rotate, invert, digital zoom, focus, color modification, tiling, wobble, or image distort.

The content that is selected by the operator to be projected as an image by the IPLD 102 can originate from the central controller 150 or other IPLDS and is sent over the communications system or the content may originate from the memory 315 of FIG. 3. The processor 316 receives the commands from the central controller 150 as received by the communications port 311. The memory 315 may contain many files of content. Each file of content can be identified with a content identifier. For example, there may be one hundred content files, numbered, for example, "1" through "100" in the memory 315. The operator of the central controller 350 may command the IPLD 102 to project content from the content file numbered "50" out of the one hundred files. The command to project content file "50" is received from the communications port 311 of IPLD 102 and the processor 316 loads the content of the content file "50" from the memory 315 and sends the content of the content file "50" to the image control 312. The content from file 50 may also be received over the communication system by communications port 311. The image control 312 sends control signals to control the light valves 375, 376 and 377 to produce images that are created by the content of the content file "50". The image control 312 may also modify the content of the content file "50" by rotating the images projected on the projection surface 100 differently that the original orientation that was provided by the content of the content file "50". The rotation of an image can be commanded by the operator of the central controller 150 by sending image rotate commands to the IPLD 102 that are received by the communications port 311 and sent to the processor 316. The processor 316 operating in accordance with the operational software stored in the memory 315 sends the appropriated image rotate control signals to the image control 312. The image control 312 can arrange pixels of the content of the content file "50" in such a way as to rotate the orientation of the original content of the content file "50" so that it might be projected on the projection surface 100 of FIG. 4 upside down or at any angle of orientation. The IPLD 102 may receive other types of commands from the central controller 150 that modify the original content to be modified in different ways by rearranging the pixels of the original content at the image control 312.

IPLD 102 of FIG. 4 shows a projection field established by solid lines 102*a* and 102*b*. The projection field determines the area that the IPLD 102 can project images on the projection surface 100. Dashed lines 102*c* and 102*d* represent the camera field. The camera field determines the area on the projection surface 100 where the camera, such as camera 364 in FIG. 3, can capture images. IPLD 104 of FIG. 4 shows the projection field established by solid lines 104*a* and 104*b*. The projection field determines the area that the IPLD 104 can project images on the projection surface 100. Dashed lines 104*c* and 104*d* represent the camera field, for the camera in IPLD 104, which may be similar to camera 364 in FIG. 3. The camera field determines the area on the projection surface 100 where the camera, such as a camera similar to camera 364, can capture images.

FIG. 4 shows a separate camera 175 that can capture images of the projection surface 100. The image data captured by the separate camera 175 is sent to the central controller 150 over line 176. The camera field is established by dashed lines 175*c* and 175*d*.

Figure 5:
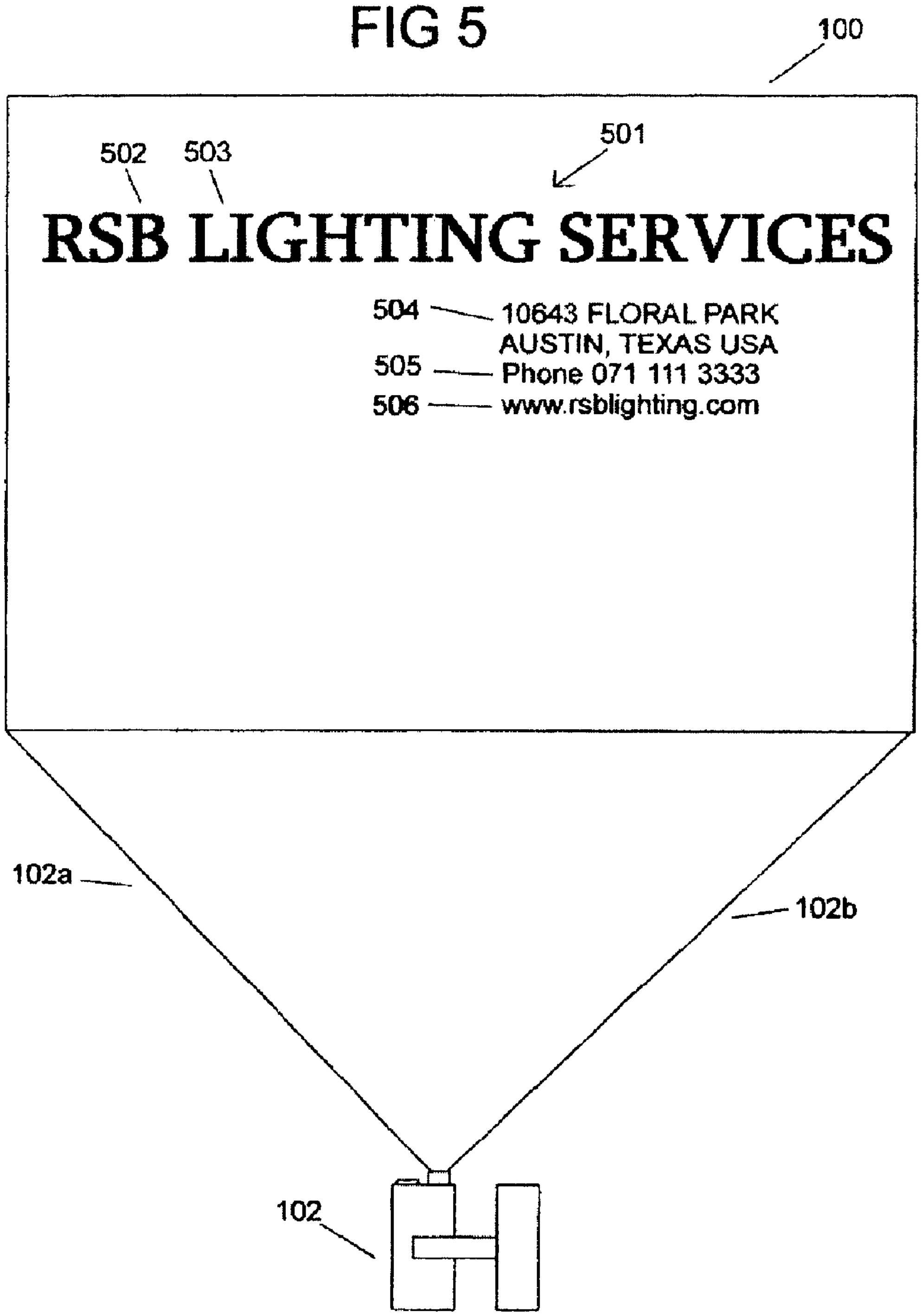
FIG. 5 shows an ownership image being projected by the image projection lighting device of FIG. 1.

FIG. 5 shows IPLD 102 projecting an ownership image 501. The memory 315 of FIG. 3 retains the ownership image. The ownership image data is input by the purchaser or responsible party that purchases the IPLD 102. The creation of the ownership image may be accomplished by sending ownership data over the communications system to the communications port 311 shown in FIG. 3 or through manual data entry to the keypad device 324. It is preferred that entry of the ownership image be done through the communications port 311 as not only can the owners name 502 and address characters 504 be entered as data but the owner's logo 503 can also be entered as data to be stored in the memory 315. If desired a phone number 505 and web address or email address 506 can be entered and may be a part of the ownership image 501. The memory 315 may be solid state, magnetic, optical or any device that can retain the ownership image in data form. When the IPLD 102 is first enabled (such as by connecting the IPLD 102 to a power source or a data stream to be received by the communications port 311) the ownership image 501 is projected onto the projection surface 100. For the ownership image to detour theft, the ownership image should remain projected onto the projection surface 100 to be visualized by the operator or other show personnel for several minutes before the IPLD 102 accepts commands to display other images from content that could be used in the show. During the data entry of the ownership image, the owner or responsible party entering the ownership data for the ownership image into the memory of the IPLD 102 also enters a password that can be later used to change the ownership image if IPLD 102 is ever sold to another entity. In addition to the ownership image 501 being projected during startup of the IPLD 102 components of the ownership image such as 20*g* of FIG. 1 or the entire image 501 of FIG. 5 may be projected by IPLD 102 when a command to identify ownership is sent from the central controller 150. The command received at the communications port 311 may be a separate identify ownership command that causes the ownership image to be displayed by the IPLD 102 on the projection surface 100 or the command could be an information display command to display information that could contain at least a part of the ownership display image 20*g* of FIG. 1 to be projected on the projection surface 100. The projected ownership image 501 of FIG. 5 can be formed with the lamp 366 of FIG. 3 cooperating with at least one of the light valves 375, 376 or 377 to form an ownership image 501 that Is projected by the projection lens 388 onto the projection surface 100. The command to project the ownership image from the projection lens 388 onto the projection surface 100 can also be accomplished by a technician inputting to the input keypad 325 that is part of the stand alone control system 326. The input entered into the stand alone control system 326 is sent to the processor 316 where it operates In accordance with the operational software and the ownership data stored in the memory 315 to send the ownership data signals to the image control 312 so that an ownership image can be formed by at least one of the light valves 375, 376 or 377 to form an ownership image 501 that is projected by the projection lens 368 onto the projection surface 100.

The IPLD 102 that contains the ownership data for projecting an ownership image will discourage theft as during the programming and use of IPLD 102 during a show the ownership image of IPLD 102 can be seen frequently by the operator and the show personnel. One way to change the ownership data and ownership image of the IPLD 102 after it has been entered by the original owner is by entry of the proper password that was created by the original owner during data entry of the ownership image. The lighting company name, address, phone number and web address in display 501 of FIG. 5 is an example only and is not meant to represent any actual existing lighting company or any entity.

The ownership image 501 residing in the memory 315 as ownership data may also be transmitted from the communications port 311 of FIG. 3 to the central controller 150 of FIG. 4 when an ownership inquiry command is sent from the central controller 150 to the communications port 311 of IPLD 102. The ownership data as transmitted over the communications system from the communications port 311 to the central controller 150 can be viewed on the visual display monitor 152 by an operator.

FIG. 1 shows a performer 10 during rehearsal of a show standing in front of the projection surface 100. The IPLD 102 is projecting onto the projection surface 100 an image 15 that comprises patterns 1, 2, 3, 4, 5 and 6. Also projected by the IPLD 102 on the projection surface 100 is an information display image 20. The information display image 20 is shown superimposed on top of the projected image 15. The information display image 20 or any identifier image component such as 20*a*, 20*b*, 20*c*, 20*d*, 20*e*, 20*f*, and 20*g* may also be projected by IPLD 102 with or without being superimposed on an additional image such as image 15. The operator of the central controller 150 while working with a plurality of IPLDS such as IPLD 102 and 104 of FIG. 4 on a show may send an information command (referred to as an info command) to the plurality of IPLDs to be received at the communications port, such as port 311 of FIG. 3 for IPLD 102, that causes the IPLDs to project the info display, such as the info display 20 of FIG. 1. The info display 20 may also be commanded by the stand alone control system 326. The information command to display the info display as input by the operator of the central controller 150 may be sent to the plurality of IPLDS by a system wide command or universal address that does not require each IPLD to respond to each specific operating address. An information command to display the info display 20 of IPLD 102 as input by the operator of the central controller 150 may be sent to a particular IPLD from a plurality of IPLDS by first sending the correct operating address for the particular IPLD followed by the information command. Alternatively the operator of the central controller 150 may input to the central controller 150 to display all info displays for all IPLDS or a select group of IPLDs from the plurality of IPLDS.

The info display 20 can be used by the operator of the central controller 150 to quickly identify a particular IPLD that is projecting on the projection surface 100 by its fixture identifying number that can be part of the info display 20. The operator of the central controller 150 keeps a list of the plurality of IPLDs used in the show as displayed on the visual display monitor 152 so they can be addressed and commanded by the operator of the central controller 150. The list of the IPLDs on the visual display monitor 152 are most often referred to as fixture numbers. An image of a fixture identifier 20*a* is shown in FIG. 1 for the IPLD 102 within the info display 20. The fixture identifier image 20*a* is referenced to the fixture identification (or fixture number) as seen by the operator for IPLD 102 on the visual display monitor 152 of FIG. 4. The fixture identifier image 20*a* may be a particular IPLD's operating address or any way of identifying, for example, the IPLD 102 visually from the plurality of IPLDS used to create the show. The fixture identifier 20*a* allows the operator of the central controller 150 the ability to send an information or "info" command to the plurality of IPLDs used to create a show while observing a particular IPLD on the projection surface 100. The plurality of IPLDs would next respond to the info command by displaying the info display 20 on each or the plurality of IPLDs such as IPLD 102 and 104. The particular IPLD that is being observed by the operator can then be quickly identified by its fixture identification image, such as 20*a*, that is projected as part of the info display image. The fixture identifier image 20*a* can be commanded to be displayed separately on the projection surface 100 without the info display 20 by a fixture identifier command received over the communications port 311 of the IPLD 102. The fixture identifier image 20*a* may also be displayed by an info command received over the communications port 311 of IPLD 102.

Often the operator of the central controller 150 finds that the programming of a plurality of multiparameter lights for a show might be time constrained. The operator may choose to display the info display 20 which may include a time identifier image on one or more of the plurality of IPLDs during programming of the show. The time identifier image can be the current time 20*b* and/or a count down timer 20*c* as shown in FIG. 1 in the info display 20 that is projected by an IPLD, such as IPLD 102 of FIG. 1. The time data used for the time identifier images 20*b* and 20*c* may originate from the clock 327 of FIG. 3 of the IPLD 102 or the time may originate from communication time data received by the communications port 311. The time identifier images 20*b* and 20*c* can be used by the operator to better manage the programming time. The time identifier image 20*b* and 20*c* can be commanded to be displayed separately on the projection surface 100 without the info display 20 by a time identifier command received over the communications port 311 of IPLD 102. The time identifier images 20*b* and 20*c* may also be displayed by an info command received over the communications port 311 of IPLD 102.

The info display 20 of FIG. 1 may also contain a show identifier image. The operator of the central controller 150 may command one or more of the plurality of IPLDS used to create a show to project the info display 20. The info display 20 can project the show identifier image 20*d* of the info display 20. The show identifier image 20*d* may identify the current show the operator is programming with the central controller 150 by either a number such as shown as 20*d* of info display 20 or the show identifier image may be a logo or text of a show's title or a performer name. The show identifier image 20*d* can be commanded to be displayed separately on the projection surface 100 without the info display 20 by a show identifier command received over the communications port 311 of IPLD 102. The show identifier 20*d* may also be displayed by an info command received over the communications port 311 of IPLD 102.

During a show the plurality of IPLDs projecting on the projection surface 100, such as IPLD 102 and 104 of FIG. 4 may each project a different image from a different content. When the operator looks at the projection surface 100 there can be many different images projected by the plurality of IPLDs. Since it is possible for the operator to become confused as to what content a particular IPLD of the plurality of IPLDs is projecting on the projection surface 100 there is a need to identify the content by use of a content identifier image. A content identifier image 20*e* of the info display 20 of FIG. 1 allows the operator to easily identify what content is being projected as an image on the projection surface 100 by the particular IPLD the operator is interested in. The content identifier image 20*e* can be commanded to be displayed separately on the projection surface 100 without the info display 20 by a content identifier command received over the communications port 311 of the IPLD 102. The content identifier 20*e* may also be displayed by an info command received over the communications port 311 of the IPLD 102.

For any image being projected on the projection surface 100 by the IPLD 102 as established by the content, the image can be further modified by the image control 312. For example the image control 312 may invert the image so that the image projected on the projection surface 100 is seen by a viewer as backwards. Various image modifying commands are sent from the central controller 150 to the communications port 311 of FIG. 3 that modify an image projected on the projection surface 100. The different types of modifications to the image can be referred to as effects. Some examples of effects to the images are invert, rotate, digital zoom, color modification, image shake, tiling, wobble and image distort. When the operator of the central controller 150 looks at a particular IPLD on the projection surface 100 and sends a content identifier command to identify the content of the particular IPLD the operator may still not know what type of modification has been applied to the identified content of the particular IPLD. An effects identifier image 20*f* of the info display 20 of FIG. 1 can be used to visually identify to the operator the effect and effect value that is used to modify an image or images that the particular IPLD is projecting on the projection surface 100. The modification of an image by the IPLD 102 may take place at the central controller 150 and be sent in its modified form to be received as content data by the communications port 311. The modification of an image as projected by the IPLD 102 may also take place at the image control 312 when image modifying commands to modify the image that IPLD 102 is projecting are received at the communications port 311. An effects identifier command from the central controller 150 to the IPLD 102 may identify what effect is used to modify the projected image and to what value or percentage the effect is applied to the image. The effects identifier image 20*f* can be commanded to be displayed separately on the projection surface 100 without the info display 20 by an effects identifier command received over the communications port 311 of IPLD 102. The effects identifier image 20*f* may also be displayed by an info command received over the communications port 311 of the IPLD 102.

The info display 20 may also display an ownership identifier image 20*g* of FIG. 1. The ownership identifier image 20*g* may contain part of or all of the information that the ownership image 501 of FIG. 5 contains. This allows a more constant visual reminder to the operator of the central controller 150 or the various show personnel of the ownership of IPLD 102. The ownership identifier 20*g* can be commanded to be displayed separately on the projection surface 100 without the info display 20 by an ownership identifier command received over the communications port 311 of IPLD 102. The ownership identifier 20*g* may also be displayed by an info command received over the communications port 311 of the IPLD 102.

The info display 20 of FIG. 1 may project one of more of images 20*a*, 20*b*, 20*c*, 20*d*, 20*e*, 20*f*, and 20*g* on the projection surface 100 when an info command received at the communications port 311 of FIG. 3. The info display 20 may be superimposed or projected simultaneously with at least one image from content from IPLD 102. Any of the identifier images 20*a*, 20*b*, 20*c*, 20*d*, 20*e*, 20*f*, or 20*g* may be projected separately without the info display by a separate identifier command received over the communication port 311 of FIG. 3. Any of the identifier images 20*a*, 20*b*, 20*c*, 20*d*, 20*e*, 20*f*, or 20*g* may be superimposed or projected simultaneously with at lease one Image from content from IPLD 102. Any of the identifier images 20*a*, 20*b*, 20*c*, 20*d*, 20*e*, 20*f*, or 20*g* may also be projected by the IPLD 102 alone on the projection surface 100 without any other image.

Figure 6:
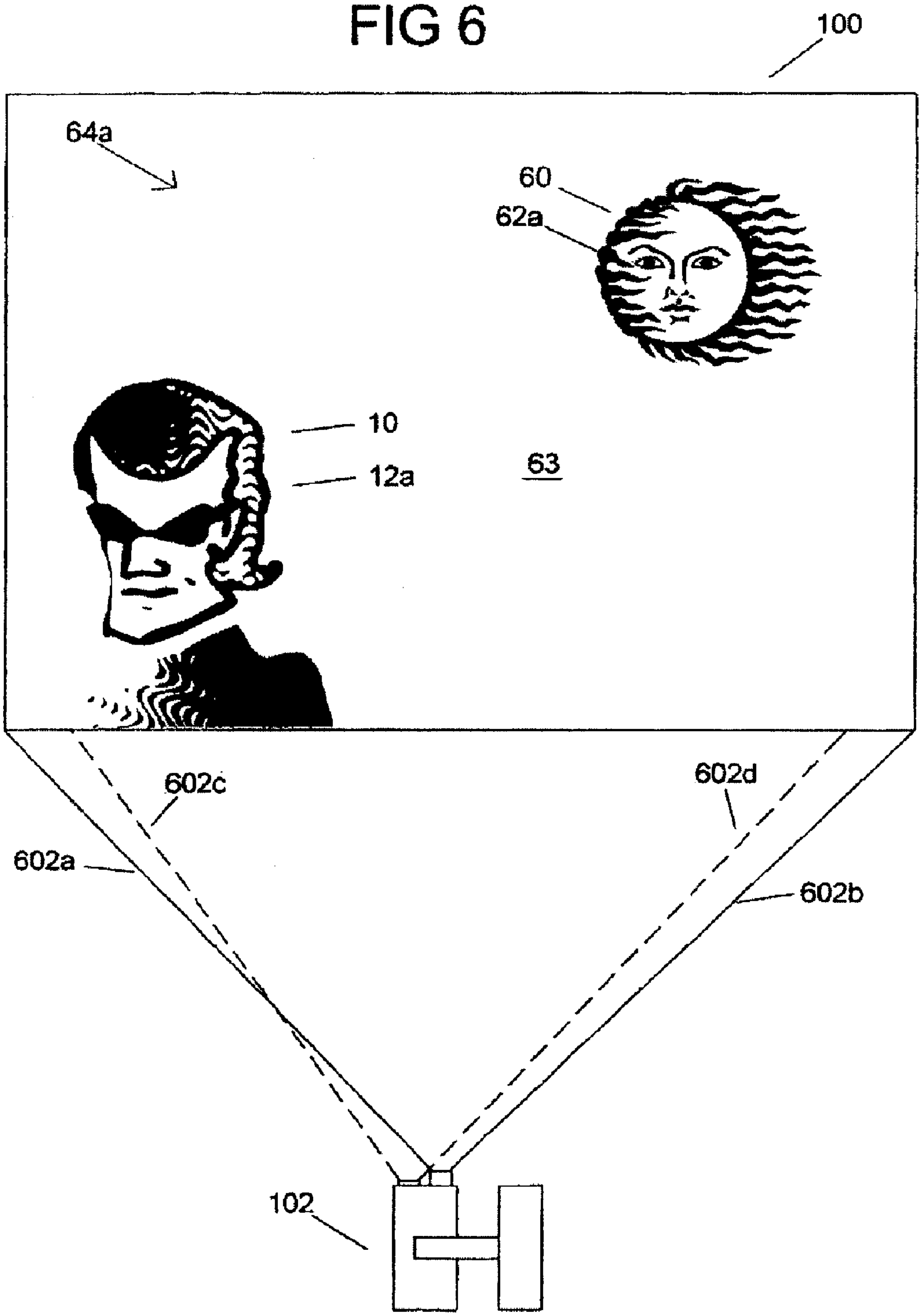
FIG. 6 shows a performer located in a first position between the image projection lighting device of FIG. 1 and a projection surface, wherein the image projection lighting device is projecting an interactive image in a first state in accordance with an embodiment of the present invention.

FIG. 6 shows the IPLD 102 projecting a first image 64*a* onto the projection surface 100. The fist image 64*a* is created from content that can be stored in the memory 315 shown in FIG. 3 or received at the communications port 311. The operator of the central controller 150 may send an interactive effect command from the central controller 150 of FIG. 4 to the communications port 311 to command a particular IPLD such as IPLD 102 to apply an interactive effect to the first image 64*a*. The operator may select which IPLD from a plurality of IPLDs, to send an interactive effect command to, by first sending the address of the particular IPLD the operator wishes to command over the communications system from the central controller 150. This allows an image projected by the IPLD 102 on the projection surface 100 to become interactive with changes on or in front of the projection surface 100. It also allows an image or images projected by the IPLD 102 that are created from content to take many forms based upon the interaction and can increase the image's value to the audience.

A performer 10 is shown on or in front of the projection surface 100 at position 12*a* in FIG. 6. The projection field for IPLD 102 of FIG. 6 is established by solid lines 602*a* and 602*b*. The IPLD 102 of FIG. 6 is also shown capturing images of the projection surface 100 and the performer 10 with the integral camera 364 of FIG. 3. The camera field is established by dashed lines 602*c* and 602*d*. The camera field determines the area that the IPLD 102 of FIG. 6 can capture images on in front of the projection surface 100. The IPLD 102 is shown projecting an image 64*a* that is comprised of blue projected light 63 that fills the projection field and projects on the performer 10 as established by lines 602*a* and 602*b* and a yellow sun image 60 that is shown in position 62*a*. The blue projected light can be called a key color.

The camera 364 of FIG. 3 of IPLD 102 can be a color camera that can capture full color images and infrared images. The camera 364 sends captured image data to the video control 317. The captured image data may be comprised of red, green and blue captured images. The camera 364 of FIG. 3 captures images of the performer 10 at position 12*a*, and the first image 64*a* that comprises a yellow sun image 60 at position 62*a* and blue light 63 projected on the projection surface 100 by IPLD 102. The camera captured colored images of the projection surface 100 and the performer 10 are sent to the video control 317 of FIG. 3. The processor 316 only analyzes camera captured images as illuminated by the projected blue light 63 portion of the image 64*a* from the IPLD 102 that illuminate the performer 10 and the projection surface 100. The processor 316 does not analyze the green or red camera captured image data to avoid false movements caused by red or green projected images that might be moving and projected by the IPLD 102.

Figure 7:
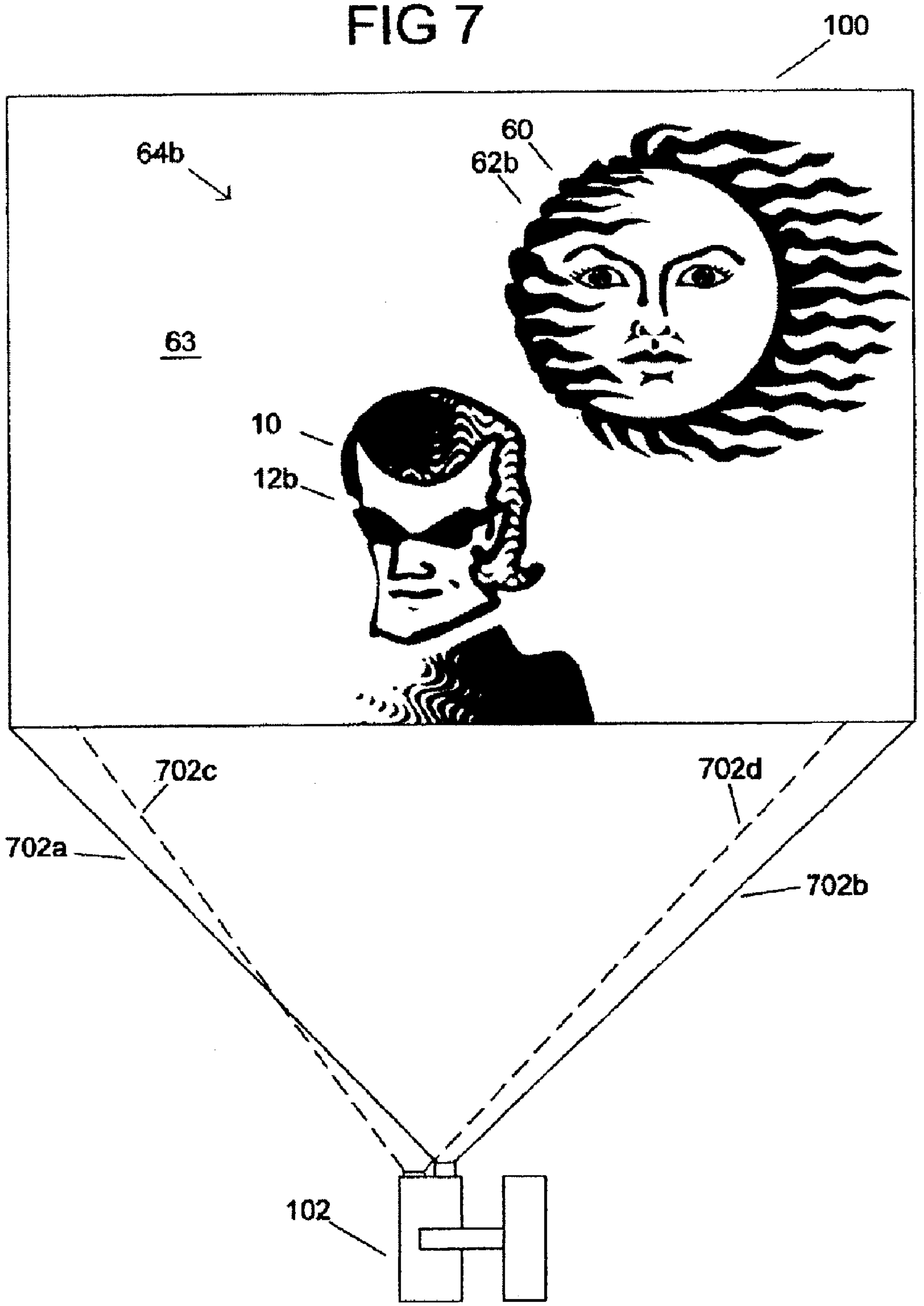
FIG. 7 shows the performer located in a second position between the image projection lighting device of FIG. 1 and the projection surface, wherein the image projection lighting device projects an interactive image in a second state.
Figure 8:
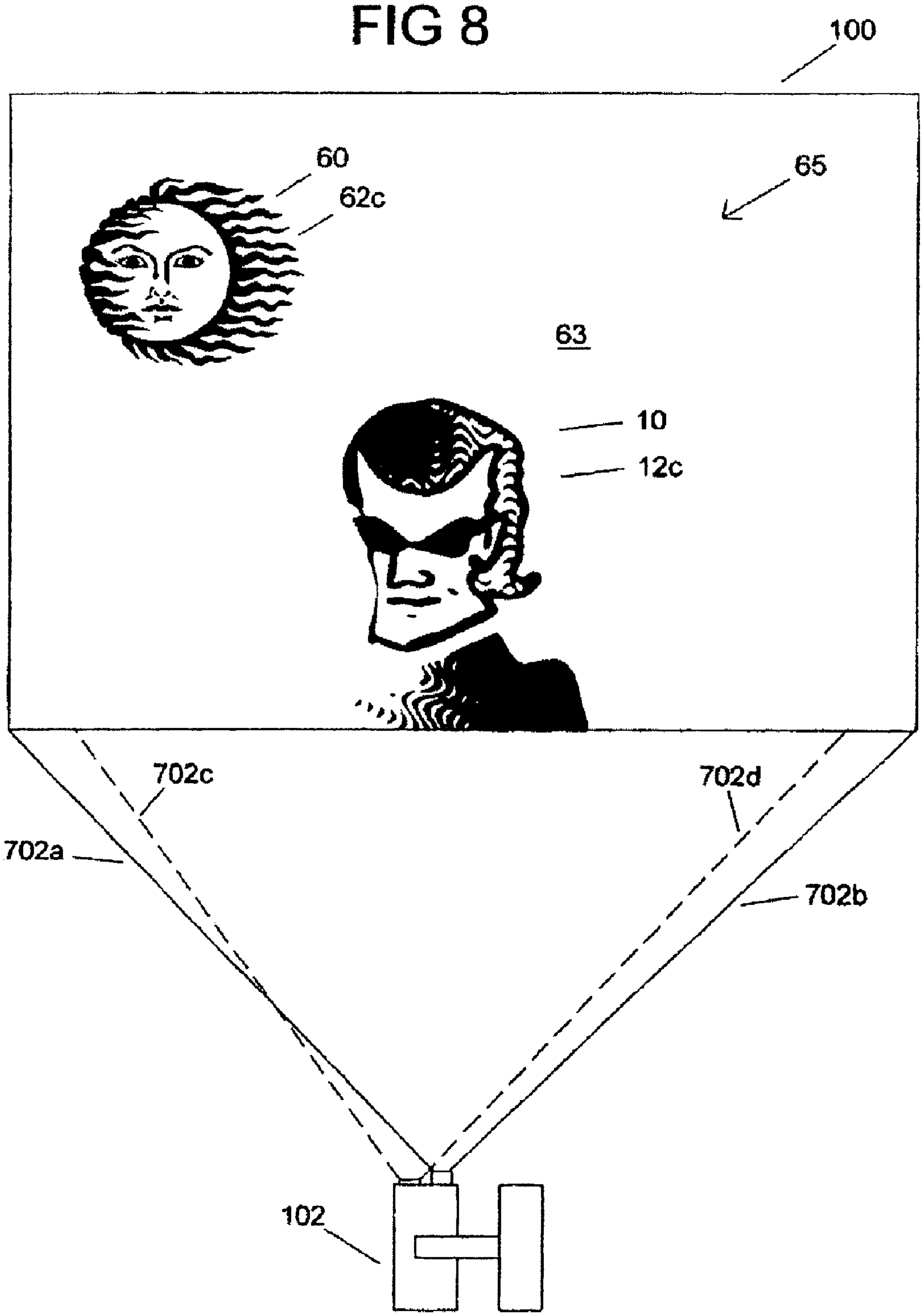
FIG. 8 shows the performer located in a third position between the image projection lighting device of FIG. 1 and the projection surface, wherein the image projection lighting device projects an interactive image in a third state.

For example, if the yellow sun image 60 were animated to move in FIG. 6 and the red or green components of the camera captured images were analyzed by the processor 316 to track movement, the processor 316 of IPLD102 would track the movement of the animated yellow sun image 60 which would not be desirable since we are trying to track the performer movements in FIGS. 6, 7 and 8. The processor 316 analyzes the camera captured blue image data to provide tracking of the movement of the performer 10 in front of the projection surface 100 as captured by the camera 364. The processor 316 may store a first frame of the blue camera captured blue image data in the memory 315 and when the second frame of camera captured blue image data is received by the processor 316, the processor 316 compares the first frame stored in the memory 315 with a second frame to determine if a difference has occurred. If a difference has occurred between the first frame and the second frame the processor 316 sends an image modifying signal to the image control 312 to modify the first projected image 64*a* that contains image 60 with an effect applied. The various effects applied to an image that that may be evoked with an image modifying signal are for example: invert, rotate, digital zoom, color modification, image shake, tiling, wobble and image distort. Effects may be created by the image control 312 in many different ways by controlling the pixels at light valves 375, 376 and 377 that make up the projected image.

FIG. 7 shows that the performer 10 has moved from position 12*a* in FIG. 6 to position 12*b*. The IPLD 102 is projecting a second image 64*b* which is created from the image 64*a* except the image 64*b* has been digitally zoomed larger than the image 64*a* to cause the yellow sun 60 to appear larger at position 62*b*. The image 64*b* has been digitally zoomed by an image modifying signal sent from the processor 316 to the image control 312. In FIG. 7, the captured image of the performer 10 has moved to position 12*b* from 12*a* of FIG. 6. The new camera captured blue image data frame of FIG. 7 was compared to a camera captured blue image data frame from the memory 315 by the processor 316 and the movement of the performer 10 from position 12*a* to 12*b* was detected in the comparison. The processor next sends an image modifying signal to the image control 312 that modifies the projected image 64*a* to 64*b* by evoking a digital zoom effect. This results in the sun image 60 of FIG. 7 enlarging to 62*b* from 62*a* of FIG. 6 as the performer 10 moved from position 12*a* of FIG. 6 to position 12*b* of FIG. 7. Since the processor 316 is comparing the camera captured blue image data of the projection surface 100 and the performer of FIG. 6 and FIG. 7, the action of the yellow sun image 60 enlarging in FIG. 7 is not analyzed by the processor 316 and only the movement of the performer 10 is used to produce an image modifying signal to the image control 312. The image modifying signal sent to the image control 312 is a signal that evokes an effect to an image due to a change on the projection surface 100.

Interactive content is defined as any content that can be used to project an image by the IPLD 102 and the image projected on the projection surface 100 can be made to change in appearance or be modified on the projection surface 100 in response to camera captured images of the performers, the audience or objects in the show.

FIG. 8 shows again that the performer 10 has moved to a new position 12*c* from that of position 12*a* of FIG. 6. The camera captured blue mage data of the performer position changing to 12*c* was compared to the camera captured blue image data of the performer in FIG. 6 at position 12*a* stored in memory 315 by the processor 316. The processor 316 determined that the performer 10 has moved from position 12*a* of FIG. 6 to position 12*c* of FIG. 8 and evoked an interactive image change routine to change the projected image 64*a* to a projected image 65. The image 65 is created from content that can be stored in the memory 315 of FIG. 3 or received at the communications port 311. In FIG. 8 the image 65 shows the same yellow sun image 60 but in a new location on the projection surface 100 shown as 62*c*. The blue projected key color 63 and the yellow sun image 60 are image components of the image 65 of FIG. 8 and the image 65 is similar to the image 64*a* of FIG. 6, but the yellow sun 60 of the image 65 is projected at a new location on the projection surface 100 compared to the image 64*a* of FIG. 6. The yellow sun image 60 is the interactive part of the content used for producing images 64*a* and 65.

The operator of the central controller 150 may send an interactive image change command from the central controller 150 of FIG. 4 to the communications port 311 to command a particular IPLD such as IPLD 102 to change a first image to a second image in response to a camera captured image. The operator may select which IPLD from a plurality of IPLDs to send an interactive image change command to by first sending over the communications system from the central controller 150 the address of the particular IPLD the operator wishes to command.

Instead of camera captured blue image data of the projection surface 100 used as a key color it is possible to use green or red or any color as camera captured image data that is preferably not projected as interactive on the projection surface 100 by any IPLD that could cause the processor 316 to determine a change has occurred on the projection surface 100 because the change detected was the interactive image itself. By using a key color as the camera captured image data that is not part of the interactive part of the projected image by IPLD 102, the processor 316 can compare changes on or to the projection surface 100 that are not contaminated by the interactive part of the projected image. The camera captured key color of the projection surface 100 to be analyzed by the processor 316 could be for example infrared, while visible light colors are projected as interactive on the projection surface 100. The infrared key color may be projected from the IPLD 102 by the projection lamp 366 of FIG. 3 working in conjunction with the projection lens 368 to project infrared light onto the projection surface 100 or the infrared light might be projected by a separate light source.

A first image is projected by IPLD 102 on the projection surface 100 from content that may be specially designed to be interactive. The camera captured images from the camera 364 of IPLD 102 of the projection surface can be compared by the processor 316 to a second camera captured image from the camera 364 of IPLD 102 of the projection surface 100 to see if a change has occurred to the projection surface 100. If a change has occurred the processor 316 may evoke a change to the first image projecting on the projection surface 100. The evoked change may be in the form of an interactive image change routine to project a second image derived from the interactive content or the change may be in the form of image modifying signal that produces a second image from the first image by applying an effect that is used to modify the first image.

A separate camera 175 of FIG. 4 may be used to capture images in front of or on the projection surface 100. The separate camera 175 may send its camera captured image data over a line 176 to the central controller 150. The camera captured image data from the camera 175 may be used by the central controller 150 to evoke changes to the projected images that are projected by IPLD 102 and/or IPLD 104. Any camera integral to an IPLD, such as IPLD 102 and 104 of FIG. 4, may also be used to send camera captured images over the communication system to be received by the central controller 150 instead of the camera captured images originating from camera 175. The central controller 150 may originate the images sent to IPLD 102 and 104 of FIG. 4 from content at the central controller 150 that is being projected on the projection surface 100 by IPLD 102 and 104 by sending the images over the communication system to the communications port 311 of IPLD 102 or a similar communications port for IPLD 104. The communication system is comprised of lines 136, 142 and 146 and may include the communications interface 138. The central controller 150 may address the IPLD 102 and then send a first image to the IPLD 102 over the communications system to be received by the communications port 311 of FIG. 3 and then acted upon by the IPLD 102 to project the first image on the projection surface 100. The central controller 150 may also address the IPLD 104 and then send a second image to the IPLD 104 to be received by the communications port 311 of FIG. 3 and then acted upon by the IPLD 104 to project the second image on the projection surface 100. The central controller 150 analyzes a camera captured first image of the projection surface 100. The central controller 150 next analyzes a camera captured second image of the projection surface and compares the first image to the second image to look for a change that has occurred on the projection surface 100. If a change has occurred on the projection surface 100 the central controller 150 addresses the IPLD 102 and then sends a third image to the IPLD 102 to be projected on the projection surface 100. The central controller 150 may also address IPLD 104 and then send a fourth image to the IPLD 104 to be projected on the projection surface 100 over the communication system. Since the IPLDs 102 and 104 have separate operating addresses the first image can be different than the second image and the third image can be different than the fourth image.

The captured camera images sent to the central controller 150 from the camera 175 can also be used by the central controller 50 to send image modifying commands to the IPLD 102 and IPLD 104. The central controller would send the operating address of the IPLD 102 to be received by the communications port 311 of FIG. 3 and then an image modifying command would be sent by the central controller 150 to be received by the IPLD 102 at the communications port 311. The image modifying command received at the communications port 311 is sent to the processor 316 where it is acted upon in accordance with the operational software stored in the memory 315 to produce an image modifying signal that is sent to the image control 317. The image modifying signal can change a first projected image into a second projected image with an effect applied.

Any camera integral to an IPLD such as IPLD 102 and 104 of FIG. 4 may also be used to send camera captured images over the communication system to be received by the central controller 150 instead of the camera captured images originating from the camera 175. The camera 175 may also be connected to the communications interface 138 where the camera captured data signals can be networked to the IPLDs 102 and 104 as well as received by the central controller 150.

The central controller 150 addresses a first IPLD 102 and then sends a first image from content originating at the central controller to the IPLD 102 over the communications system to be received by the communications port 311 of FIG. 3 and then acted upon by the IPLD 102 to project the first image on the projection surface 100. The central controller 150 may also address a second IPLD 104 and send a second image from content originating at the central controller to the IPLD 104 to be received by the communications port 311 of FIG. 3 and then acted upon by the IPLD 104 to project the second image on the projection surface 100. The central controller 150 analyzes a camera captured first image of the projection surface 100. The central controller 150 next analyzes a camera captured second image of the projection surface and compares the camera captured first image to the camera captured second image data to look for a change that has occurred on the projection surface 100. If a change has occurred on the projection surface 100, the central controller 150 addresses IPLD 102 and sends an image modifying command to be received by the communications port 311 of FIG. 3 of the IPLD 102 to modify the first image with an effect. The first image projected by IPLD 102 is modified by the effect as commanded by the image modifying command to create a third image projected by IPLD 102. The central controller 150 may also address IPLD 104 and send an image modifying command to be received by the communications port 311 of FIG. 3 of IPLD 104 to modify the second image with an effect. The second image projected by IPLD 104 is modified by the effect as commanded by the image modifying command to create a fourth image projected by IPLD 104. Some examples of effects that can modify the projected images projected by IPLD 102 and 104 that can be commanded by an image modifying command from the central controller 150 are invert, rotate, digital zoom, color modification, image shake, tiling, wobble and image distort.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A multiparameter lighting fixture comprising:

a base;

a yoke;

a memory;

a lamp housing, wherein the lamp housing is remotely positioned in relation to the base housing by a motor;

a communications port for receiving address and command signals;

the lamp housing comprising
a lamp,
a light valve, and
a lens, wherein the lamp, the light valve and the lens cooperate to project an ownership image on a projection surface; and
wherein the ownership image is created by ownership image data and the ownership image data can be entered by an operator,
and wherein the ownership image data in stored in the memory.

2. The multiparameter lighting fixture of claim 1
wherein the ownership image projected on the projection surface is comprised of an email address.

3. The multiparameter lighting fixture of claim 1
wherein the ownership image projected on the projection surface is comprised of a name of an owner.

4. The multiparameter lighting fixture of claim 1
wherein the ownership image projected on the projection surface is comprised of a geographical address.

5. The multiparameter lighting fixture of claim 1
wherein the ownership image projected on the projection surface is comprised of a phone number.

6. The multiparameter lighting fixture of claim 1
wherein the ownership image projected on the projection surface is comprised of a web address.

7. The multiparameter lighting fixture of claim 1
wherein the ownership image projected on the projection surface is comprised of a logo.

8. The multiparameter lighting fixture of claim 1
wherein the ownership image can be changed by an operator with a password.

9. A multiparameter lighting fixture comprising:
a base housing, the base housing comprising a stand alone control system, the stand alone control system comprising an input device end a display device;
a yoke;
a memory;
a lamp housing, wherein the lamp housing is remotely positioned in relation to the base housing by a motor;
a communications port for receiving address and command signals;
the lamp housing comprising
a lamp,
a light valve, and
a lens;
wherein the lamp, the light valve, and the lens cooperate to project an ownership image on a projection surface and wherein the ownership image is created by ownership data entered by an operator by interfacing with the input device and the ownership data it stored in the memory.

10. A multiparameter lighting fixture comprising:
a base;
a yoke;
a memory;
a lamp housing, wherein the lamp housing is remotely positioned in relation to the base housing by a motor;
a communications port for receiving command signals;
the lamp housing comprising
a lamp,
a light valve, and
a lens;
the lamp, the light valve, and the lens cooperating to project an ownership image on a projection surface; and
wherein the communications port receives a command and the lamp, the light valve, and the lens cooperate by projecting the ownership image on the projection surface and wherein the ownership image was created by ownership image data stored in the memory and wherein the ownership image data was entered into the memory by an operator.

11. A multiparameter lighting fixture comprising:
a base;
a yoke;
a lamp housing;
a communications port for receiving address and command signal;
the lamp housing comprising
a lamp,
a light valve, and
a lens;
wherein the lamp, the light valve, and the lens cooperate to project a fixture identifier image on a projection surface that is used to identify the multiparameter lighting fixture from a plurality of multiparameter lighting fixtures projecting on the projection surface.

12. The multiparameter lighting fixture of claim 11
wherein the fixture identifier image is displayed on the projection surface in response to a command from a central controller and an operator of the central controller identifies the multiparameter lighting device.

13. The multiparameter lighting fixture of claim 12
wherein the fixture identifier image is superimposed over an additional image being projected by the image projection lighting device.

14. The multiparameter lighting fixture of claim 11 wherein
the lamp housing is remotely positioned in relation to the base housing by a motor;
and wherein the fixture identifier image is numerically displayed on the projection surface in response to a command from a central controller and an operator of the central controller identifies the multiparameter lighting fixture.

15. The multiparameter lighting fixture of claim 14
wherein the fixture identifier image is superimposed over an additional image being projected by the image projection lighting device.

16. A multiparameter lighting fixture comprising:
a base;
a yoke;
a lamp housing;
a communications port for receiving address and command signals;
the lamp housing comprising
a lamp,
a light valve, and
a lens;
wherein the lamp, the light valve, and the lens cooperate to project a time identifier image on a projection surface that can be observed by an operator of a central controller to better manage programming time.

17. The multiparameter lighting fixture of claim 16
wherein the time identifier image is displayed on the projection surface in response to a command from the central controller.

18. The multiparameter lighting fixture of claim 16 wherein the time identifier image is superimposed over an additional image being projected by the multiparameter lighting fixture.

19. The multiparameter lighting fixture of claim of claim 16 wherein the time identifier image is a count down timer image.

20. The multiparameter lighting fixture of claim 16 wherein the lamp housing is remotely positioned in relation to the base housing by a motor; and wherein the time identifier image is displayed on the projection surface in response to a command from the central controller.

21. The multiparameter lighting fixture of claim of claim 20 further comprising a clock component; and wherein the time identifier image has timing;

and wherein the timing is derived from the clock component.

22. A multiparameter lighting fixture comprising:

a base;

a yoke;

a lamp housing;

a communications port for receiving address and command signals;

the lamp housing comprising a lamp, a light valve, and a lens;

wherein the lamp, the light valve, and the lens cooperate to projects show identifier image on a projection surface that can be observed by an operator of a central controller to identify a current show.

23. The multiparameter lighting fixture of claim 22 wherein the show identifier image is a logo.

24. The multiparameter lighting fixture of claim 22 wherein the show identifier image is a performer's name who is performing during the current show.

25. The multiparameter lighting fixture of claim 22 wherein the show identifier image is a title of the current show.

26. The multiparameter lighting fixture of claim 22 wherein the show identifier image is displayed on the projection surface in response to a command from a central controller.

27. The multiparameter lighting fixture of claim 22 wherein the show identifier image is superimposed over an additional image being projected by the multiparameter lighting fixture.

28. The multiparameter lighting fixture of claim 22 wherein the lamp housing is remotely positioned in relation to the base housing by a motor.

29. The multiparameter lighting fixture of claim 28 wherein the show identifier image is a logo.

30. The multiparameter lighting fixture of claim 28 wherein the show identifier image is a performer's name who is performing during the current show.

31. The multiparameter lighting fixture of claim 28 wherein the show identifier image is a title of the current show.

32. The multiparameter lighting fixture of claim 28 wherein the show identifier image is displayed on the projection surface in response to a command from the central controller.

33. A multiparameter lighting fixture comprising:

a base;

a yoke;

a lamp housing;

a communications port for receiving address and command signals;

the lamp housing comprising a lamp, a light valve, and a lens, wherein the lamp, the light valve, and the lens cooperate to project a content identifier image on a projection surface that can be observed by an operator of a central controller to identify the content used to project an image on the projection surface.

34. The multiparameter lighting fixture of claim 33 wherein the content identifier image is displayed on the projection surface in response to a command from a central controller.

35. The multiparameter lighting fixture of claim 33 wherein the content identifier image is superimposed over an additional image being projected by the multiparameter lighting fixture.

36. The multiparameter lighting fixture of claim 33 wherein the lamp housing is remotely positioned in relation to the base housing by a motor;

and wherein the content identifier image is displayed on the projection surface in response to a command from the central controller.

37. A multiparameter lighting fixture comprising:

a base;

a yoke;

a lamp housing;

a communication port for receiving address and command signals;

the lamp housing comprising a lamp, a light valve, and a lens;

the lamp, the light valve, and the lens cooperate to project an effects identifier image on a projection surface that is Observed by an operator of a central controller to identify an effect used to modify an image on the projection surface.

38. The multiparameter lighting fixture of claim 37 wherein the effects identifier image is displayed on the projection surface in response to a command from a central controller.

39. The multiparameter lighting fixture of claim 37 wherein the effects identifier image is superimposed over an additional image being projected by the multiparameter lighting fixture.

40. The multiparameter lighting fixture of claim 37 wherein the lamp housing is remotely positioned in relation to the base housing by a motor:

and wherein the effects identifier image is displayed on the projection surface in response to a command from the central controller.

41. A multiparameter lighting fixture comprising:

a base;

a yoke;

a lamp housing;

a communications port for receiving address and command signals;

the lamp housing comprising
a lamp,
a light valve, and
a lens; and wherein the lamp, the light valve, and the lens cooperate to project an ownership identifier image on a projection surface that can be observed by an operator of a central controller to identify ownership of the multiparameter lighting fixture.

42. The multiparameter lighting fixture of claim 41 wherein the ownership identifier image is displayed on the projection surface in response to a command from a central controller.

43. The multiparameter lighting fixture of claim 41 wherein the ownership identifier image is superimposed over an additional image being projected by the multiparameter lighting fixture.

44. The multiparameter lighting fixture of claim 41 wherein the lamp housing is remotely positioned in relation to the base housing by a motor;

and wherein the ownership identifier image is displayed on the projection surface in response to a command from the central controller.

45. A multiparameter lighting fixture comprising:

a housing;

a yoke;

a memory;

a lamp housing, wherein the lamp housing is remotely positioned in relation to the base housing by a motor;

a communications port for receiving address and command signals;

the lamp housing comprising
a lamp,
a light valve, and
a lens;

wherein the lamp, the light valve, and the lens cooperate to project an ownership image on a projection surface;

wherein the ownership image is created by ownership image data and the ownership image data is entered into the memory by an operator;

and wherein the ownership image is automatically projected on the projection surface when the multiparameter lighting fixture is enabled.

46. The multiparameter lighting fixture of claim 45 wherein the ownership image projected on the projection surface is comprised of an email address.

47. The multiparameter lighting fixture of claim 45 wherein the ownership image projected on the projection surface is comprised of a name of an owner.

48. The multiparameter lighting fixture of claim 45 wherein the ownership image projected on the projection surface is comprised of a geographical address.

49. The multiparameter lighting fixture of claim 45 wherein the ownership image projected on the projection surface is comprised of a phone number.

50. The multiparameter lighting fixture of claim 45 wherein the ownership image projected on the projection surface is comprised of a web address.

51. The multiparameter lighting fixture of claim 45 wherein the ownership image projected on the projection surface is comprised of a logo.

52. A multiparameter lighting fixture comprising:

a base housing;

a yoke;

a memory;

a lamp housing, wherein the lamp housing is remotely positioned in relation to the base housing by a motor;

a communications port for receiving address and command signals;

the lamp housing comprising
a lamp,
a light valve, and
a lens; and wherein ownership image date can he entered into the memory by an operator and wherein in response to an ownership inquiry command received at the communications port, ownership data is transmitted from the communications port.

53. A multiparameter lighting fixture comprising:

a base;

a yoke;

a lamp housing;

a communications port for receiving address and command signals;

the lamp housing comprising
a lamp,
a light valve, and
a lens; and wherein in response to an ownership inquiry command received at the communications port ownership data is transmitted from the communications port; and wherein the ownership data transmitted from the communications port is transmitted to a central controller to be viewed on a monitor of the central controller.

* * * * *